US009696907B2

(12) United States Patent
Shu et al.

(10) Patent No.: US 9,696,907 B2
(45) Date of Patent: *Jul. 4, 2017

(54) REMOVE-ON-DELETE TECHNOLOGIES FOR SOLID STATE DRIVE OPTIMIZATION

(71) Applicant: MICROSOFT TECHNOLOGY LICENSING, LLC, Redmond, WA (US)

(72) Inventors: Frank J. Shu, Bellevue, WA (US); Nathan S. Obr, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/961,809

(22) Filed: Dec. 7, 2015

(65) Prior Publication Data
US 2016/0162194 A1   Jun. 9, 2016

Related U.S. Application Data

(63) Continuation of application No. 12/030,193, filed on Feb. 12, 2008, now Pat. No. 9,207,876.
(Continued)

(51) Int. Cl.
*G06F 12/00* (2006.01)
*G06F 3/06* (2006.01)
(Continued)

(52) U.S. Cl.
CPC .......... *G06F 3/0604* (2013.01); *G06F 3/0619* (2013.01); *G06F 3/0643* (2013.01);
(Continued)

(58) Field of Classification Search
CPC ............. G06F 12/0866; G06F 12/0246; G06F 2212/214; G06F 3/061
See application file for complete search history.

(56) References Cited

U.S. PATENT DOCUMENTS 5,193,184 A   3/1993   Belsan et al.
5,535,399 A   7/1996   Blitz et al.
(Continued)

FOREIGN PATENT DOCUMENTS

JP        2006216036 A    8/2006
KR    1020070014980 A    2/2007
(Continued)

OTHER PUBLICATIONS

"Data Management Software (OMS) for AMD Simultaneous Read/Write Flash Memory Devices", In AMD, Publication No. 22274, Revision A, Jul. 2003, (10 Pages total).
(Continued)

*Primary Examiner* — Mardochee Chery
(74) *Attorney, Agent, or Firm* — Mark K. Young; Mayer & Williams PC

(57) ABSTRACT

Technologies for identifying data stored on a solid state drive ("SSD") device that correspond to data associated with a delete event, and marking the deleted data stored on the SSD as invalid such that the SSD can avoid unnecessary operations on the invalid data. Included are interfaces operable to communicate invalid data information providing a remove-on-delete command that provides invalid data information sufficient to identify the SSD data to be marked as invalid.

20 Claims, 3 Drawing Sheets

Related U.S. Application Data

(60) Provisional application No. 60/912,728, filed on Apr. 19, 2007.

(51) Int. Cl.
*G06F 12/0866* (2016.01)
*G06F 12/02* (2006.01)

(52) U.S. Cl.
CPC .......... *G06F 3/0659* (2013.01); *G06F 3/0673* (2013.01); *G06F 3/0679* (2013.01); *G06F 12/0246* (2013.01); *G06F 12/0866* (2013.01); *G06F 2212/214* (2013.01); *G06F 2212/7209* (2013.01)

(56) References Cited

U.S. PATENT DOCUMENTS

| | | | |
|---|---|---|---|
| 5,553,261 | A | 9/1996 | Hasbun et al. |
| 5,598,370 | A | 1/1997 | Niijima et al. |
| 5,682,497 | A | 10/1997 | Robinson |
| 6,014,724 | A * | 1/2000 | Jenett .................. G06F 3/0607 711/103 |
| 6,236,593 | B1 | 5/2001 | Hong et al. |
| 6,715,027 | B2 | 3/2004 | Kim et al. |
| 7,082,512 | B2 | 7/2006 | Aasheim et al. |
| 8,572,310 | B2 * | 10/2013 | Oh .......................... G06F 3/061 711/103 |
| 2002/0116569 | A1 | 8/2002 | Kim et al. |
| 2004/0177054 | A1 | 9/2004 | Stern et al. |
| 2006/0149893 | A1 | 7/2006 | Barfuss et al. |
| 2006/0179263 | A1 | 8/2006 | Song et al. |
| 2006/0184722 | A1 | 8/2006 | Sinclair |
| 2007/0033362 | A1 | 2/2007 | Sinclair |
| 2007/0043900 | A1 | 2/2007 | Yun |
| 2007/0204128 | A1 | 8/2007 | Lee et al. |
| 2007/0300008 | A1 | 12/2007 | Rogers et al. |
| 2008/0098159 | A1 | 4/2008 | Song et al. |

FOREIGN PATENT DOCUMENTS

| | | |
|---|---|---|
| RU | 2280273 C2 | 7/2006 |
| TW | 200302458 A | 8/2003 |
| TW | 200535609 A | 11/2005 |
| TW | 200608198 A | 3/2006 |

OTHER PUBLICATIONS

"NAND Flash Memories and Programming NAND Flash Memories Using ELNEC Device Programmers", In NAND Flash Memories Application Note, Version 2.02, Mar. 2007, (32 Pages total).
"Supplementary Search Report Issued in European Patent Application No. 08744884.1", Mailed Date: May 18, 2012, (6 Pages total).
"Office Action Issued in Korean Patent Application No. 10-2009-7021257", Mailed Date: Apr. 25, 2014, (5 Pages total).
"Office Action Issued in Korean Patent Application No. 10-2009-7021257", Mailed Date: Nov. 27, 2014, (13 Pages total).
"Final Office Action Issued in Chinese Patent Application No. 200880012571.X", Mailed Date: Sep. 4, 2013, (9 Pages total).
"First Office Action Issued in Chinese Patent Application No. 200880012571.X", Mailed Date: May 20, 2011, (7 Pages total).
"Fourth Office Action Issued in Chinese Patent Application No. 200880012571.X", Mailed Date: May 6, 2013, (9 Pages total).
"Second Office Action Issued in Chinese Patent Application No. 200880012571.X", Mailed Date: Mar. 22, 2012, (7 Pages total).
"Third Office Action Issued in Chinese Patent Application No. 200880012571.X", Mailed Date: Oct. 22, 2012, (11 Pages total).
"Notice of Allowance Issued in Russian Patent Application No. 2009138348", Mailed Date: Feb. 1, 2012, (20 Pages total).
"Final Office Action Issued in Japanese Patent Application No. 2010-504149", Mailed Date: Jun. 25, 2013, (6 Pages total).
"JP Judgment in Trial Issued in Application No. 2010-504149", Mailed Date: Nov. 18, 2014, (23 Pages total).
"Office Action Issued in Japanese Patent Application No. 2010-504149", Mailed Date: Oct. 31, 2012, (6 Pages total).
"Notice of Allowance Issued in Taiwan Patent Application No. 97113635", Mailed Date: Aug. 21, 2015, (6 Pages total).
"Office Action and Search Report Issued in Taiwan Patent Application No. 97113635", Mailed Date: Oct. 23, 2014, (9 Pages total).
"Office Action Issued in Taiwan Patent Application No. 97113635", Mailed Date: Mar. 27, 2015, (8 Pages total).
Garfinkel, et al., "One Big File Is Not Enough: A Critical Evaluation of the Dominant Free-Space Sanitization Technique", In Proceedings of International Workshop on Privacy Enhancing Technologies, vol. 4258, Jun. 28, 2006, pp. 135-151(17 pages total).
"International Search Report & Written Opinion Issued in PCT Application No. PCT/US08/59048", Mailed Date: Aug. 25, 2008, (10 Pages total).
CN Decision on Reexamination for Application No. 200880012571. X, Apr. 29, 2016.

* cited by examiner

REMOVE-ON-DELETE TECHNOLOGIES FOR SOLID STATE DRIVE OPTIMIZATION

CROSS-REFERENCE TO RELATED APPLICATIONS

This Application is a Continuation of, and claims benefit from, U.S. patent application Ser. No. 12/030,193 that was filed Feb. 12, 2008, and that is a Non Provisional to U.S. Provisional Patent Application No. 60/912,728 that was filed on Apr. 19, 2007, each of which is incorporated herein by reference in its entirety.

BACKGROUND

Solid state drives ("SSD") are becoming economical for use as bootable mass storage devices. SSDs are commonly fabricated to include flash memory devices, such as non-volatile flash memory devices including Not AND ("NAND") type devices. Accordingly, an SSD write operation has different considerations than does a typical hard disk drive ("HDD") that can over-write invalid (deleted) data with valid (new) data at the same physical location on the disk. SSD write operations typically include a page-oriented merge operation so as to merge the new data with existing data of the same memory block into a new memory block. Should the existing data be invalid, such a merge operation may unnecessarily impact SSD performance. Additionally, for reliability reasons, SSDs typically perform "wear leveling" operations to reduce memory cell life-span degradation. Such operations typically move data from one block or page to another block or page. Should the data on one page be invalid, a wear leveling operation for that page may unnecessarily impact SSD performance and potentially decrease SSD reliability. Further, typical file systems generally maintain state information indicating which data are considered deleted (invalid) and which are not But this data is not typically migrated to a corresponding storage device, such as an HDD or SSD, in a manner that corresponds to all the data and where the data is physically stored on the device, as one or more logical block addresses for example. Accordingly storage devices, as opposed to file systems, are generally unaware of what data is valid and what data is invalid, and are therefore typically unable to recognize invalid data so as to avoid unnecessary operations on such data.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide technologies for identifying data stored on a solid state drive ("SSD") device that correspond to data associated with a delete event, and marking the deleted data stored on the SSD as invalid such that the SSD can avoid unnecessary operations on the invalid data. Included are interfaces operable to communicate invalid data information and to provide a remove-on-delete command that provides invalid data information sufficient to identify the corresponding SSD data to be marked as invalid.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein.

Like reference numerals are used to designate like parts in the accompanying drawings.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in a computing environment, the environment described is provided as an example and not a limitation. As those skilled in the art will appreciate, the present examples are suitable for application in a variety of different types of computing environments.

Figure 1:
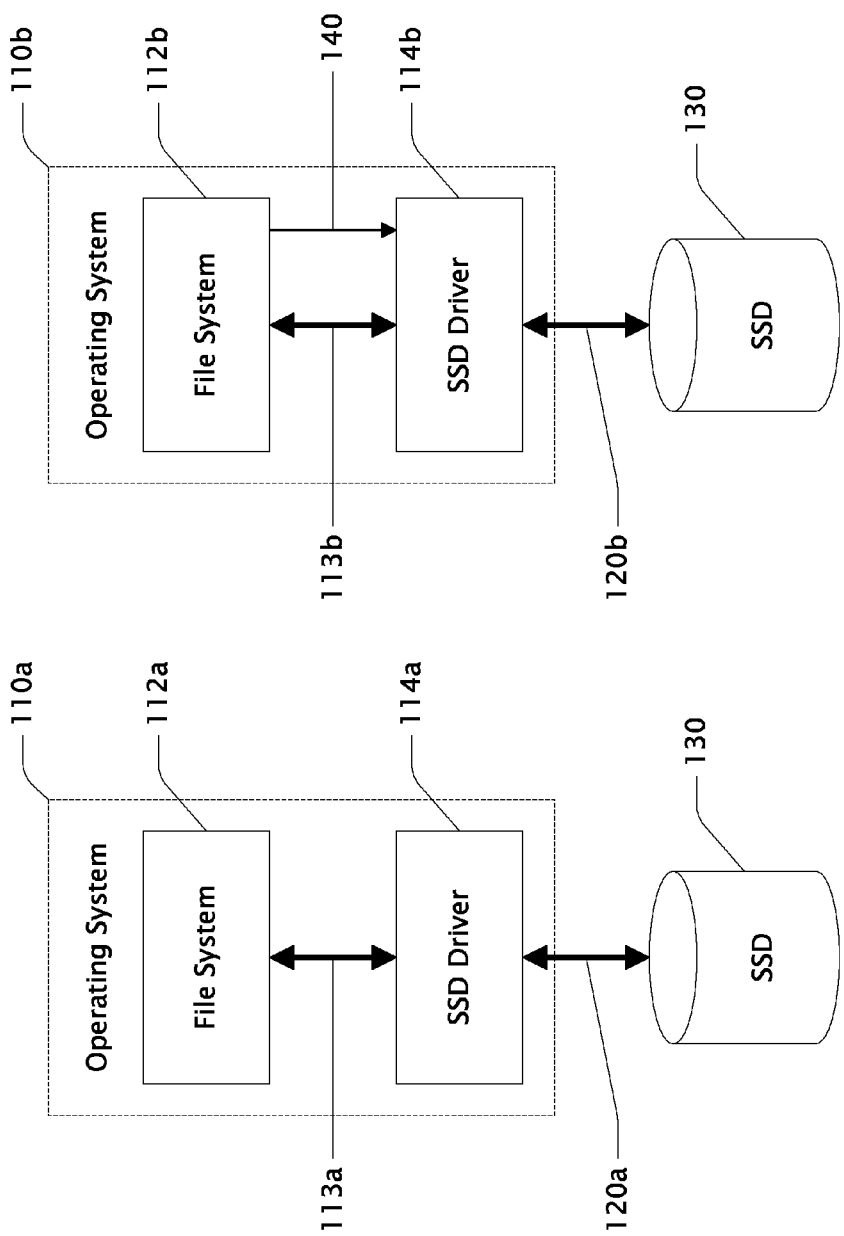
FIG. 1 is block diagram showing a conventional operating system and interface to a solid state drive, and a new operating system and interface to the solid state drive.

FIG. 1 is block diagram showing a conventional operating system 110a and interface 120a to a solid state drive 130, and a new operating system 110b and interface 120b to the solid state drive ("SSD") 130. Conventional operating system 110a includes an example conventional file system 112a coupled to an example conventional SSD driver 114a via conventional interface 113a. One example of interface 113a is an input/output control ("IOCTL") interface. File system 112a typically manages the abstraction of data as files, folders, properties, and the like. Data may be any type of digital information, executable instructions, or the like. These abstractions are typically transformed into physical data access and storage constructs by SSD driver 114a which interacts with SSD 130 via interface 120a to store and access data on SSD 130. Examples of interface 120a include the advanced technology attachment ("ATA") interface and the small computer system interface ("SCSI") and the like.

Example SSD 130 is a solid state storage device fabricated using solid-state memory devices or the like as the storage medium, as opposed to magnetic or optical storage media such as with conventional HDDs, floppy disks, compact disks, or the like. These solid state memory devices may be flash memory, or any other type or combination of solid-state memory, random access memory ("RAM"), or the like. Such SSD devices may be boot devices and may be considered primary storage devices or mass storage devices such as those described in connection with FIG. 3. Such SSD devices may be composite SSD devices, that is SSD devices comprising a plurality of memory types or classes where each class has differing performance characteristics or access speeds. Descriptions herein of functionality of or action by an SSD device generally refer to the SSD device and/or a corresponding SSD driver, such as example drivers 114a and 114b.

In another example, SSD 130 may be a conventional HDD, optical drive, storage area network ("SAN"), tape storage device, and/or any other form of storage device including the mass storage devices described in connection with FIG. 3, that may include data that may be considered invalid. The present invention may be applied to any such storage devices, systems, mechanisms, or the like.

Consider the following example describing how invalid data is typically represented on an SSD. A user, such as a person or system, may indicate via any suitable interface that some data, such as a file, should be deleted. The file system typically modifies a persistent data structure indicating the file has been deleted, such as by removing a reference to the deleted file from a directory or the like. Further, the file system may mark the data representing the file on the SSD as invalid. In one example, this includes sending file location information indicating the beginning of the file via logical block addressing ("LBA") typically followed by the length of the file to the SSD. The LBA or data location information describing the data to be deleted is typically sent by command via an interface to the SSD device. Upon receiving the command and associated data location information, the SSD and/or its driver can mark as invalid data stored on the SSD that corresponds to the deleted file. In a conventional computing system, the file system may be aware of files that are deleted, but an SSD is not. A typically SSD is only aware that data is written to it and read from it with no differentiation between valid and invalid data. Some SSDs and their associated drivers may perform operations that would benefit from being aware of data stored on them that is invalid. For example, a typical SSD write operation has different considerations than does atypical hard disk drive ("HDD") that can over-write invalid (deleted) data with valid (new) data at the same physical location on the disk. Unlike typical HDDs, SSD write operations typically include a page-oriented merge operation intended to merge the new data with existing data on a memory block to a new memory block. Should the existing data be invalid, such a merge operation may unnecessarily impact SSD performance. Additionally, for reliability reasons, SSDs typically perform "wear leveling" operations to reduce memory cell life-span degradation. Such operations typically move data from one memory block to another block or the like. Should the page and/or block data be invalid, a wear leveling operation for that page/block may unnecessarily impact SSD performance and potentially decrease SSD reliability.

As used herein, invalid data may be data stored in memory locations, such as SSD memory locations, that have been deleted by a higher-level system, such as a file system, driver, application, or the like, or that are unused, or the like. For example, when a file is deleted, the data associated with the file may be considered invalid. Note that such deleted or invalid data is not typically removed or erased, but may simply be classified as invalid. In one example, such invalid data remains stored on the storage device. In another example, invalid data may be "garbage collected" or otherwise removed, overwritten, or the like. Data that are not classified as invalid are typically considered valid. Generally a file system or the like is aware of data classification as valid or invalid, as opposed to an SSD.

Example new operating system 110b includes example new file system 112b coupled to example new SSD driver 114b via conventional interface 113b and new interface 140. In general, the functionality of elements 110b, 112b, and 114b correspond to that of their similarly numbered "1xxa" conventional counterparts, but new functionality is added for the present invention. Example file system 112b may alternatively be an application or the like embodying file system functionality.

File system 112b utilizes new interface 140 to communicate invalid data information to SSD driver 114b. Such invalid data information may include file location and size information. Interface 140 enables file system 112b to indicate to SSD driver 114b via the invalid data information exactly which data stored on SSD 130 are invalid. In one example, interface 140 is a new IOCTL command. In another example, interface 140 is an extension of an existing IOCTL command. Interface 140 may conform to any format and/or structure suitable for coupling a file system and an SSD driver sufficient to communicate invalid data information. Further, interface 140 may also enable file system 112b to indicate to SSD driver 114b that valid data being written to SSD 130 is valid causing the valid data stored on SSD 130 to not be marked as invalid.

Interface 120b, in one example, conforms to an ATA interface with additional functionality for communicating invalid data information. And in another example, interface 120b conforms to a SCSI interface with additional functionality for communicating invalid data information. Interface 120b may conform to any format and/or structure suitable for coupling an SSD driver and an SSD device sufficient to communicate invalid data information.

Given the invalid data information, SSD driver 114b typically interacts with SSD 130 via interface 120b to mark appropriate data, blocks, pages, or the like as invalid according to the invalid data information. Accordingly, write merge operations, wear leveling operations, and the like can be performed without unnecessarily operating on invalid data. Further, optimization operations may be performed on SSD blocks, pages, and the like that are marked as containing invalid data.

Figure 2:
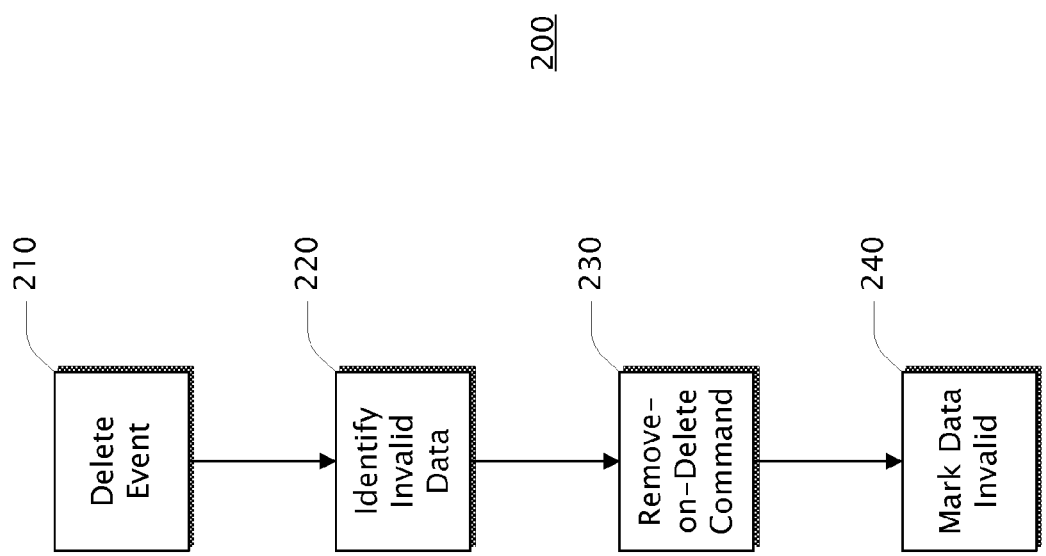
FIG. 2 is a block diagram showing an example remove-on-delete method.

FIG. 2 is a block diagram showing an example remove-on-delete method 200. Such a method may be used to mark deleted SSD data as invalid, otherwise known as "remove-on-delete". Invalid or removed data is thus removed from consideration by an SSD device as valid data. This frees the SSD device from performing any operations to preserve or maintain such data.

Block 210 indicates a delete event impacting data stored on an SSD device. One example of such a delete event is a file delete operation performed by a file system wherein the file being deleted is currently stored on an SSD device. In other examples, any system or mechanism may perform a delete operation impacting data stored on an SSD device. Typically, an SSD driver corresponding to the SSD device receives and/or detects the delete event. Method 200 typically continues at block 220.

Block 220 indicates identifying which data stored on the SSD device correspond to the data being deleted. In one example, this involves mapping the data of the file being deleted to the corresponding data stored on an SSD. Such mapping results in invalid data information identifying which data stored on the SSD are to be marked as invalid. Such mapping may be performed by the system performing the delete operation. The invalid data information identifies the exact data stored on the SSD that corresponds to the file being deleted and that is to be marked as invalid. Such data may be stored on the SSD as pages, blocks, or the like. Once the invalid data corresponding to the delete operation and stored on the SSD are identified, method 200 typically continues at block 230.

Block 230 indicates a remove-on-delete command. This command typically includes the invalid data information and instructs the SSD device and/or its driver to mark the indicated data as invalid. In one example, such a command is issued by the system performing the delete operation, such as a file system. Once the remove-on-delete command has been issued, method 200 typically continues at block 240.

Block 240 indicates marking the deleted data as invalid. Such a mark may take any form sufficient to identify the invalid data to the SSD device. Such marking may involve marking pages and/or blocks or the like as invalid, depending on how the SSD structures its data. Alternatively, such marking may include removing a range of invalid data to an invalid data table or the like. Once the deleted data s marked as invalid, the SSD device is freed from performing any operations to preserve, maintain, or the like the invalid data. Note that the data is considered deleted by the higher-level system, such as a file system, and that the corresponding data is now marked as invalid on the SSD in such a manner that the SSD can recognize the corresponding data as invalid. For example, if the file system is deleting the file "foo.bar", then all data stored on the SSD that comprises the file foo.bar is marked as invalid. The term information may also refer to data. Once the deleted data in marked as invalid, method 200 is typically complete.

Figure 3:
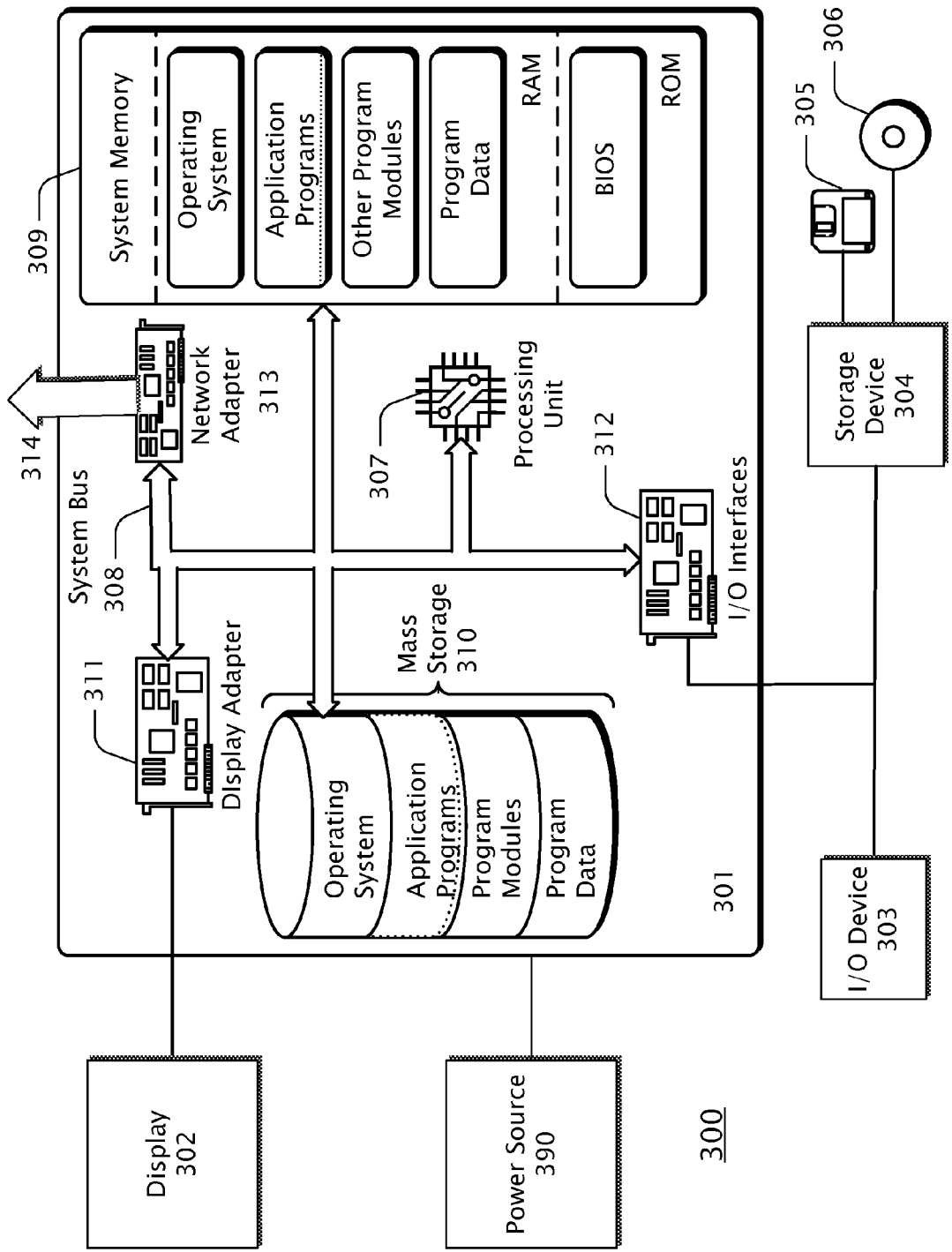
FIG. 3 is a block diagram showing an example computing environment in which the technologies described herein may be implemented.

FIG. 3 is a block diagram showing an example computing environment 300 in which the technologies described herein may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 300 typically includes a general-purpose computing system in the form of a computing device 301 coupled to various components, such as peripheral devices 302, 303, 304 and the like. System 300 may couple to various other components, such as input devices 303, including voice recognition, touch pads, buttons, keyboards and/or pointing devices, such as a mouse or trackball, via one or more input/output ("I/O") interfaces 312. The components of computing device 301 may include one or more processors (including central processing units ("CPU"), graphics processing units ("GPU"), microprocessors ("µP"), and the like) 307, system memory 309, and a system bus 308 that typically couples the various components. Processor 307 typically processes or executes various computer-executable instructions to control the operation of computing device 301 and to communicate with other electronic and/or computing devices, systems or environment (not shown) via various communications connections such as a network connection 314 or the like. System bus 308 represents any number of several types of bus structures, including a memory bus or memory controller, a peripheral bus, a serial bus, an accelerated graphics port, a processor or local bus using any of a variety of bus architectures, and the like.

System memory 309 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 309 typically stores data, computer-executable instructions and/or program modules comprising computer-executable instructions that are immediately accessible to and/or presently operated on by one or more of the processors 307.

Mass storage devices 304 and 310 may be coupled to computing device 301 or incorporated into computing device 301 via coupling to the system bus and/or a storage bus or the like. Such mass storage devices 304 and 310 may include non-volatile RAM, a magnetic disk drive which reads from and/or writes to a removable, non-volatile magnetic disk (e.g., a "floppy disk") 305, and/or an optical disk drive that reads from and/or writes to a non-volatile optical disk such as a CD ROM, DVD ROM 306. Alternatively, a mass storage device, such as hard disk 310, may include non-removable storage medium. Other mass storage devices may include memory cards, memory sticks, tape storage devices, and the like.

Any number of computer programs, files, data structures, and the like may be stored in mass storage 310, other storage devices 304, 305, 306 and system memory 309 (typically limited by available space) including, by way of example and not limitation, operating systems, application programs, data files, directory structures, computer-executable instructions, and the like.

Output components or devices, such as display device 302, may be coupled to computing device 301, typically via an interface such as a display adapter 311. Output device 302 may be a liquid crystal display ("LCD"). Other example output devices may include printers, audio outputs, voice outputs, cathode ray tube ("CRT") displays, tactile devices or other sensory output mechanisms, or the like. Output devices may enable computing device 301 to interact with human operators or other machines, systems, computing environments, or the like. A user may interface with computing environment 300 via any number of different I/O devices 303 such as a touch pad, buttons, keyboard, mouse, joystick, game pad, data port, and the like. These and other I/O devices may be coupled to processor 307 via I/O interfaces 312 which may be coupled to system bus 308, and/or may be coupled by other interfaces and bus structures, such as a parallel port, game port, universal serial bus ("USB"), fire wire, infrared ("IR") port, and the like.

Computing device 301 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 301 may be coupled to a network via network adapter 313 or the like, or, alternatively, via a modem, digital subscriber line ("DSL") link, integrated services digital network ("ISDN") link, Internet link, wireless link, or the like.

Communications connection 314, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 390, such as a battery or a power supply, typically provides power for portions or all of computing environment 300. In the case of the computing environment 300 being a mobile device or portable device or the like, power source 390 may be a battery. Alternatively, n the case computing environment 300 is a desktop computer or server or the like, power source 390 may be a power supply designed to connect to an alternating current ("AC") source, such as via a wall outlet.

Some mobile devices may not include many of the components described in connection with FIG. 3. For example, an electronic badge may be comprised of a coil of wire along with a simple processing unit 307 or the like, the coil configured to act as power source 390 when in proximity to a card reader device or the like. Such a coil may also be configure to act as an antenna coupled to the processing unit 307 or the like, the co ii antenna capable of providing a form of communication between the electronic badge and the card reader device. Such communication may not involve networking, but may alternatively be general or special purpose communications via telemetry, point-to-point, RF, IR, audio, or other means. An electronic card may not include display 302, I/O device 303, or many of the other components described in connection with FIG. 3. Other mobile devices that may not include many of the components described in connection with FIG. 3, by way of example and not imitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, software, programs, or the like maintained in an electronic device such as a ROM or the like. The term "software" generally refers to executable instructions, code, data, drivers, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A method performed on a solid state drive ("SSD") coupled to a computing device via a SSD driver, the method comprising:
   receiving, by the SSD via the SSD driver from a file system of the computing device in response to a remove-on-delete command from the file system that indicates a deletion of at least a portion of a file in the file system, invalid data information that indicates that particular data stored on the SSD is considered invalid by the file system, where the particular data corresponds to the at least the portion of the file; and
   marking, by the SSD based on the received invalid data information, the particular data stored on the SSD as invalid, where the file system is separate from the SSD driver and the SSD.

2. The method of claim 1 where the remove-on-delete command instructs the SSD or the SSD driver to mark the particular data as invalid.

3. The method of claim 1 where the remove-on-delete command was issued in response to the deletion.

4. The method of claim 1 where the marking comprises marking pages or blocks on the SSD as invalid.

5. The method of claim 1 where, in response to the marking, the SSD is freed from performing any operations to preserve or maintain the particular data marked as invalid.

6. The method of claim 1 further comprising identifying, based on the received invalid data information, the particular data stored on the SSD that corresponds to the at least a portion of a file in the file system being deleted.

7. The method of claim 1 further comprising performing, by the SSD, a merge or wear-leveling operation without including the particular data marked as invalid.

8. A solid state drive ("SSD") comprising:
   memory; and
   an interface via which the SSD receives, via an SSD driver from a file system in response to a remove-on-delete command from the file system that indicates a deletion of at least a portion of a file in the file system, invalid data information that indicates that particular data stored in the memory of the SSD is considered invalid by the file system, where the particular data corresponds to the at least the portion of the file, where the SSD is configured for marking, based on the received invalid data information, the particular data stored in the memory of the SSD as invalid, where the file system is separate from the SSD driver and the SSD.

9. The SSD of claim 8 where the remove-on-delete command instructs the SSD or the SSD driver to mark the particular data as invalid.

10. The SSD of claim 8 where the remove-on-delete command was issued in response to the deletion.

11. The SSD of claim 8 where the marking comprises marking pages or blocks of the memory on the SSD as invalid.

12. The SSD of claim 8 where, in response to the marking, the SSD is freed from performing any operations to preserve or maintain the particular data marked as invalid.

13. The SSD of claim 8 further configured for identifying, based on the received invalid data information, the particular data stored on the SSD that corresponds to the at least a portion of a file in the file system being deleted.

14. The SSD of claim 8 further configured for performing, by the SSD, a merge or wear-leveling operation without including the particular data marked as invalid.

15. At least one hardware-based computer-readable medium not consisting of propagated signals, comprising:
hardware memory that comprises computer-readable instructions that, based on execution by a solid state drive ("SSD"), configure the SSD to perform actions comprising:
receiving, by the SSD via the SSD driver from a file system of the computing device in response to a remove-on-delete command from the file system that indicates a deletion of at least a portion of a file in the file system, invalid data information that indicates that particular data stored on the SSD is considered invalid by the file system, where the particular data corresponds to the at least the portion of the file; and
marking, by the SSD based on the received invalid data information, the particular data stored on the SSD as invalid, where the file system is separate from the SSD driver and the SSD.

16. The at least one computer-readable medium of claim 15 where the remove-on-delete command instructs the SSD or the SSD driver to mark the particular data as invalid.

17. The at least one computer-readable medium of claim 15 where the remove-on-delete command was issued in response to the deletion, or where the marking comprises marking pages or blocks on the SSD as invalid.

18. The at least one computer-readable medium of claim 15 where, in response to the marking, the SSD is freed from performing any operations to preserve or maintain the particular data marked as invalid.

19. The at least one computer-readable medium of claim 15, the actions further comprising identifying, based on the received invalid data information, the particular data stored on the SSD that corresponds to the at least a portion of a file in the file system being deleted.

20. The at least one computer-readable medium of claim 15, the actions further comprising performing, by the SSD, a merge or wear-leveling operation without including the particular data marked as invalid.

* * * * *